United States Patent [19]
Yamada et al.

[11] Patent Number: 5,489,998
[45] Date of Patent: Feb. 6, 1996

[54] COLOR IMAGE PROCESSING APPARATUS HAVING TRANSMITTER AND RECEIVER WHICH PERFORM COLOR CORRECTION IN ACCORDANCE WITH A COMMON STANDARD COLOR IMAGE AND METHOD FOR SAME

[75] Inventors: Osamu Yamada, Tokyo; Toshihiko Nakazawa, Yokohama; Yasutomo Suzuki, Yokohama; Hirokazu Uchio, Yokohama, all of Japan

[73] Assignee: Canon Kabushiki Kaisha, Tokyo, Japan

[21] Appl. No.: 376,376

[22] Filed: Jan. 23, 1995

Related U.S. Application Data

[63] Continuation of Ser. No. 206,266, Mar. 7, 1994, abandoned, which is a continuation of Ser. No. 841,580, Feb. 26, 1992, abandoned.

[30] Foreign Application Priority Data

Mar. 4, 1991 [JP] Japan .................................. 3-037416
Mar. 4, 1991 [JP] Japan .................................. 3-037423

[51] Int. Cl.⁶ ............................................. G03F 3/08
[52] U.S. Cl. .......................................... 358/523; 358/518
[58] Field of Search ................................... 358/504, 518, 358/523; 348/645; H04N 9/64, 1/46

[56] References Cited

U.S. PATENT DOCUMENTS

| | | | |
|---|---|---|---|
| 4,888,636 | 12/1989 | Abe | 358/80 |
| 4,959,669 | 9/1990 | Haneda et al. | 358/80 |
| 5,053,866 | 10/1991 | Johnson | 358/518 X |
| 5,060,059 | 10/1991 | Mori et al. | 358/80 |
| 5,107,332 | 4/1992 | Chan | 358/518 |
| 5,142,356 | 8/1992 | Usami et al. | 358/80 |
| 5,172,224 | 12/1992 | Collette et al. | 358/80 |
| 5,331,441 | 7/1994 | Akuzawa et al. | 358/518 |

*Primary Examiner*—Victor R. Kostak
*Assistant Examiner*—John W. Miller
*Attorney, Agent, or Firm*—Fitzpatrick, Cella, Harper & Scinto

[57] ABSTRACT

In color image communication between different kinds of apparatuses, an output image which accurately reproduces a transmitted original image is obtained by individually providing color correction units in apparatuses at the transmitting side and the receiving side and by obtaining color correction parameters in accordance with a predetermined or standard color image.

16 Claims, 9 Drawing Sheets

FIG. I

WARM-COLOR-TYPE COLOR PATCH

COLD-COLOR-TYPE COLOR PATCH

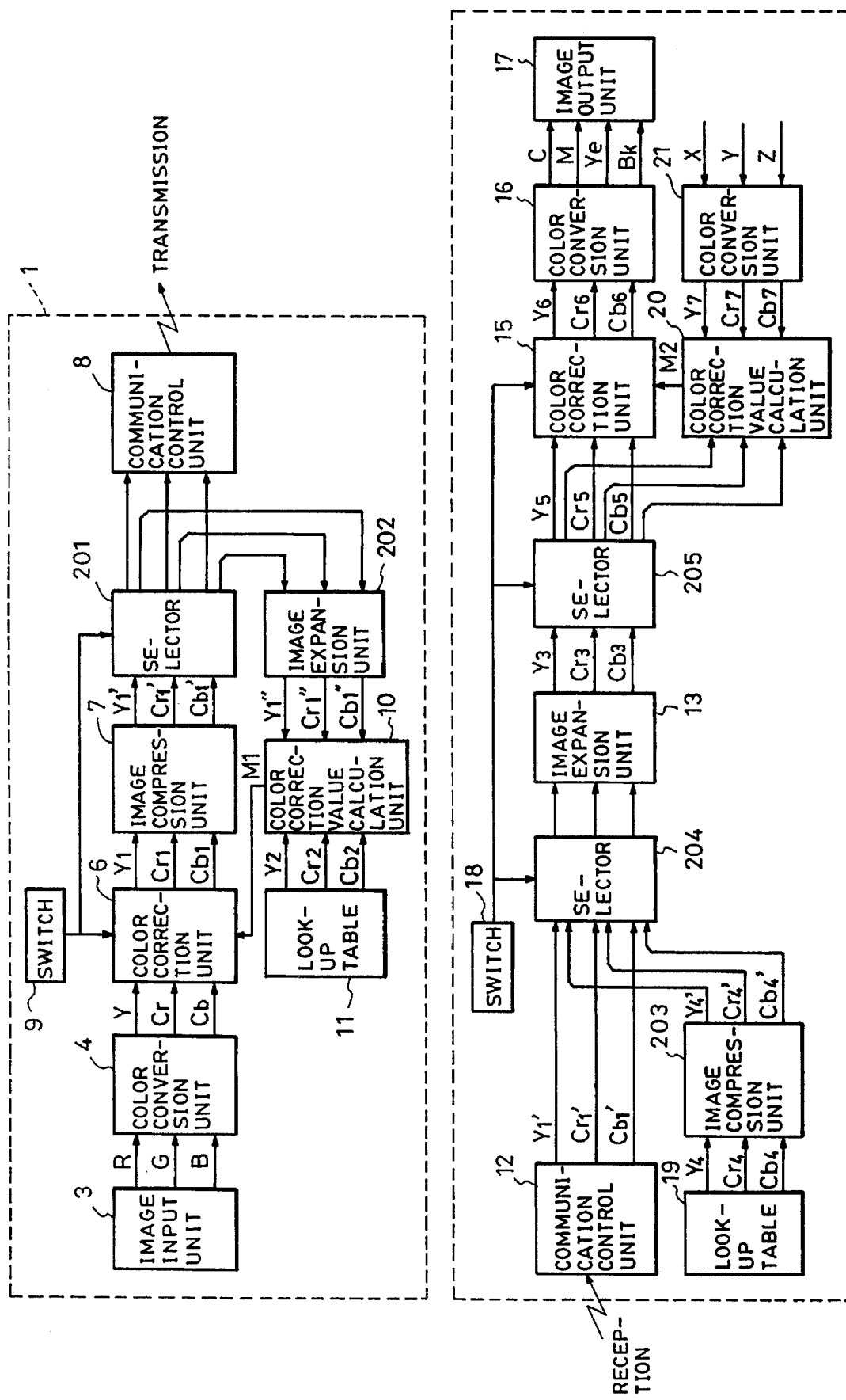

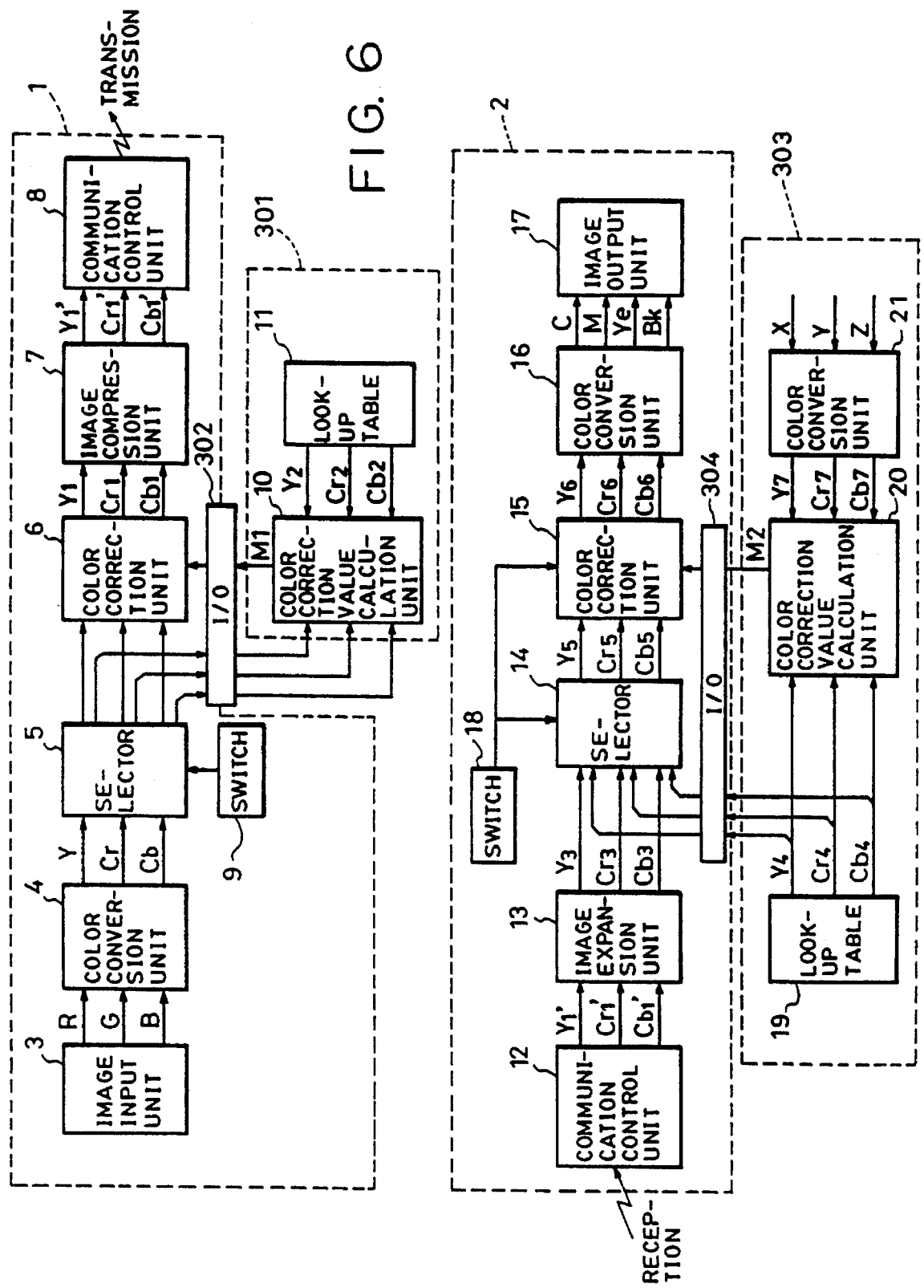

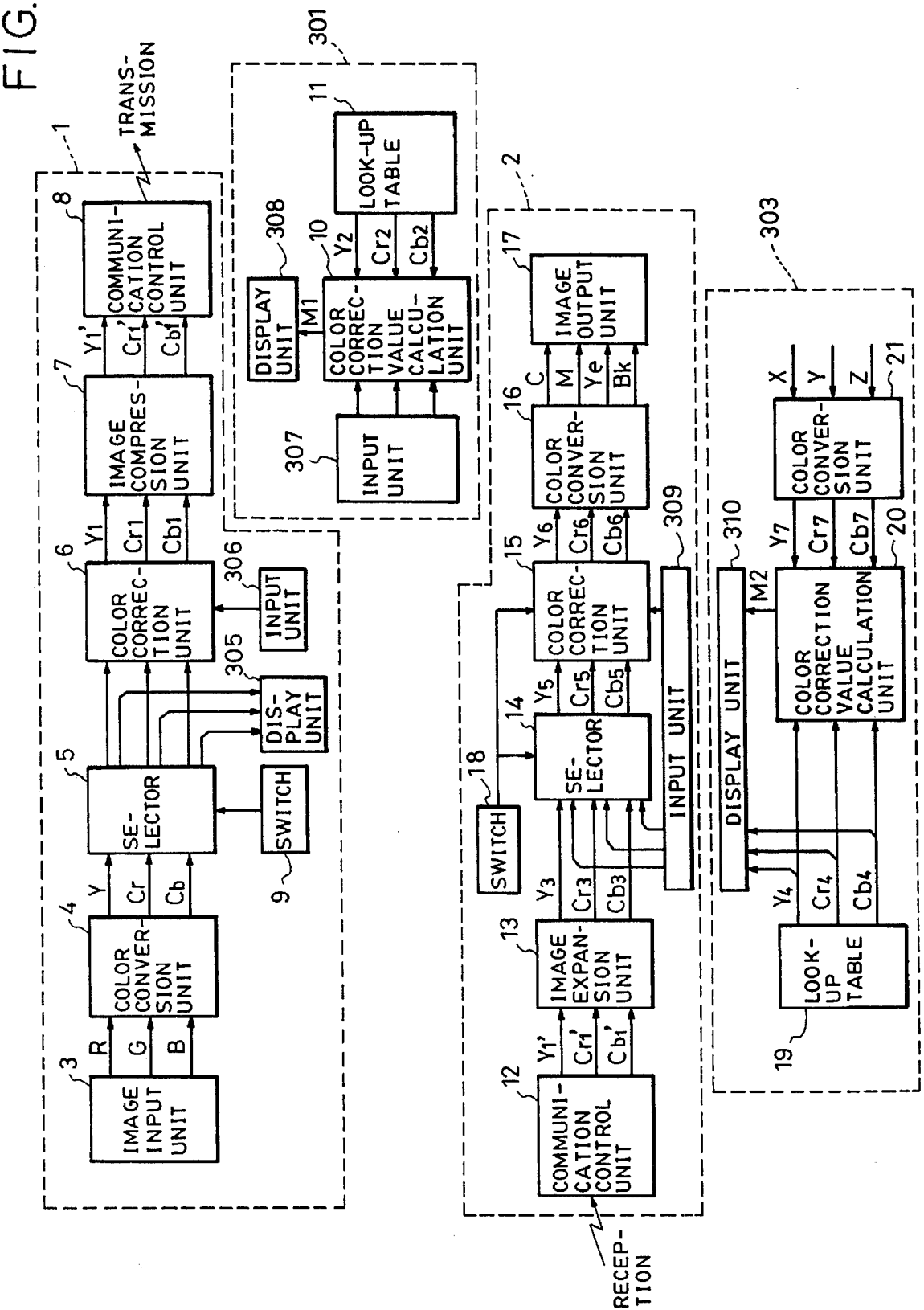

COLOR IMAGE PROCESSING APPARATUS HAVING TRANSMITTER AND RECEIVER WHICH PERFORM COLOR CORRECTION IN ACCORDANCE WITH A COMMON STANDARD COLOR IMAGE AND METHOD FOR SAME

This application is a continuation of application Ser. No. 08/206,266 filed Mar. 7, 1994, now abandoned, which is a continuation of application Ser. No. 07/841,580 filed Feb. 26, 1992, now abandoned.

BACKGROUND OF THE INVENTION

1. Field of the Invention

This invention relates to a color image processing method and apparatus used in color image communication.

2. Description of the Related Art

Heretofore, color image communication between different kinds of apparatuses has been performed in the following manner. That is, different kinds of color image apparatuses communicate with each other through connector cables, communication network or the like for transmitting and receiving color images, such apparatuses include color scanners, color printers, and apparatuses incorporating a color scanner and a color printer. In a copying operation in an apparatus incorporating a color scanner and a color printer, such as a color copier, an input image and an output image can be compared with each other since the color scanner and the color printer are located in the vicinity of each other. Thus, it is possible to perform color correction by a black-box-like approach, that is, by a method the contents of which are unknown to the user, and to obtain a copied image which is an accurate reproduction of an original image. That is, it is easy to provide an output image having a color tone which is faithful to the color tone of an input image. On the other hand, in color image communication, since a transmitter and a receiver are in general separated from each other, it is impossible to compare a transmitted image with a received image. Accordingly, a color image is transmitted from the transmitter to the receiver without the operator knowing whether or not proper color correction has been performed.

In the above-described conventional approach, it is impossible to perform proper color correction in color image communication if the transmitting side color scanner and the receiving side color printer are not identified. Hence, the conventional approach has the following disadvantages:

(1) The receiving side cannot obtain an output image represented by accurately produced colors of an original image transmitted from the transmitting side. Hence, the hue, lightness, saturation and the like of the output image deviate from those of the original image.

(2) Even if color matching is obtained between certain kinds of apparatuses, accurate reproduction of colors is not guaranteed if the kinds of apparatus change.

A technique of selecting color correction coefficients by inputting a standard color image, and comparing an output color image obtained by processing the standard color image with the standard image has been disclosed in U.S. Pat. No. 4,888,636 and U.S. application Ser. No. 07/789,450 filed Nov. 7, 1991, both of which are commonly-assigned.

However, such a technique cannot solve the above-described problems in the transmission/reception system.

Particularly, a technique wherein errors produced in encoding and decoding processing are considered has not been proposed.

SUMMARY OF THE INVENTION

The present invention has been made in consideration of the above-described problems in the conventional approach.

It is an object of the present invention to provide a color image processing method and apparatus in which color reproducibility is improved in color image communication.

It is a further object of the present invention to obtain an excellent reproduced image in color image transmission by normalizing color component signals.

It is a still further object of the present invention to reduce errors in encoding when encoding, particularly irreversible encoding, is performed.

It is still another object of the present invention to perform color image processing in accordance with characteristics of image input means and image output means.

It is still a further object of the present invention to perform excellent image processing without being influenced by a change with time.

It is still another object of the present invention to perform image tranmission having an excellent transmission efficiency.

It is still another object of the present invention to simplify the configuration of circuitry.

According to an aspect of the present invention, a color image processing apparatus comprises an input means for inputting a standard color signal and an input image. An encoding means encodes the input standard color signal, and a decoding means decodes the encoded standard color signal. A correcting means is provided for performing color correction of the input image in accordance with both the input standard color signal and the decoded standard color signal.

According to another aspect of the present invention, a color image processing apparatus comprises an inputting means for inputting a standard color image signal, and a correcting means for performing color correction of the input standard color image signal by using a predetermined parameter. An encoding means encodes the color-corrected standard image signal, and a decoding means decodes the encoded standard color image signal. A determining means is provided for determining the predetermined parameter on the basis of both the input standard color image signal and the decoded standard color image signal.

According to a further aspect of the present invention, a color image processing system comprises a sending apparatus for performing color correction of an input color image in accordance with a first parameter and for sending the color-corrected color image. A receiving apparatus receives the sent color image by the sending means and color corrrects the received color image in accordance with a second parameter. A determining means is provided for determining the first and second parameters in accordance with a standard color image.

According to yet another aspect of the present invention, a color image processing apparatus is provided for transmitting image data to a receiving apparatus having a function of performing color correction for received image data in accordance with a first color correction parameter determined on the basis of a standard color image. The apparatus comprises a color correcting means for performing color correction of input image data in accordance with a second correction parameter. A caclculating means determines the second color correction parameter for the color correcting means on the basis of the standard color image.

According to yet a further aspect of the present invention, a color image processing method is provided for transmitting image data to a receiving apparatus for performing color correction for received image data in accordance with a first color correction parameter determined on the basis of a standard color image. Color correction is performed for input image data in accordance with a second parameter. The second color correction parameter is determined in the color correcting step on the basis of the standard color image.

According to still yet another aspect of the present invention, a color image processing apparatus is provided for receiving image data from a transmitting apparatus for performing color correction for input image data in accordance with a first color correction parameter determined on the basis of a standard color image. The apparatus comprises a color correcting means for performing color correction of received image data in accordance with a second color correction parameter. A calculating means is provided for determining the second color correction parameter of the color correcting means on the basis of the standard color image.

The foregoing and other objects and features of the present invention will become more apparent from the following description taken in connection with the accompanying drawings, and of the appended claims.

BRIEF DESCRIPTION OF THE DRAWINGS

FIG. 5 is a block diagram illustrating a second embodiment of the present invention;

FIG. 6 is a block diagram illustrating a third embodiment of the present invention;

FIG. 7 is another block diagram illustrating the third embodiment;

DETAILED DESCRIPTION OF THE PREFERRED EMBODIMENTS

First Embodiment

Figure 1:
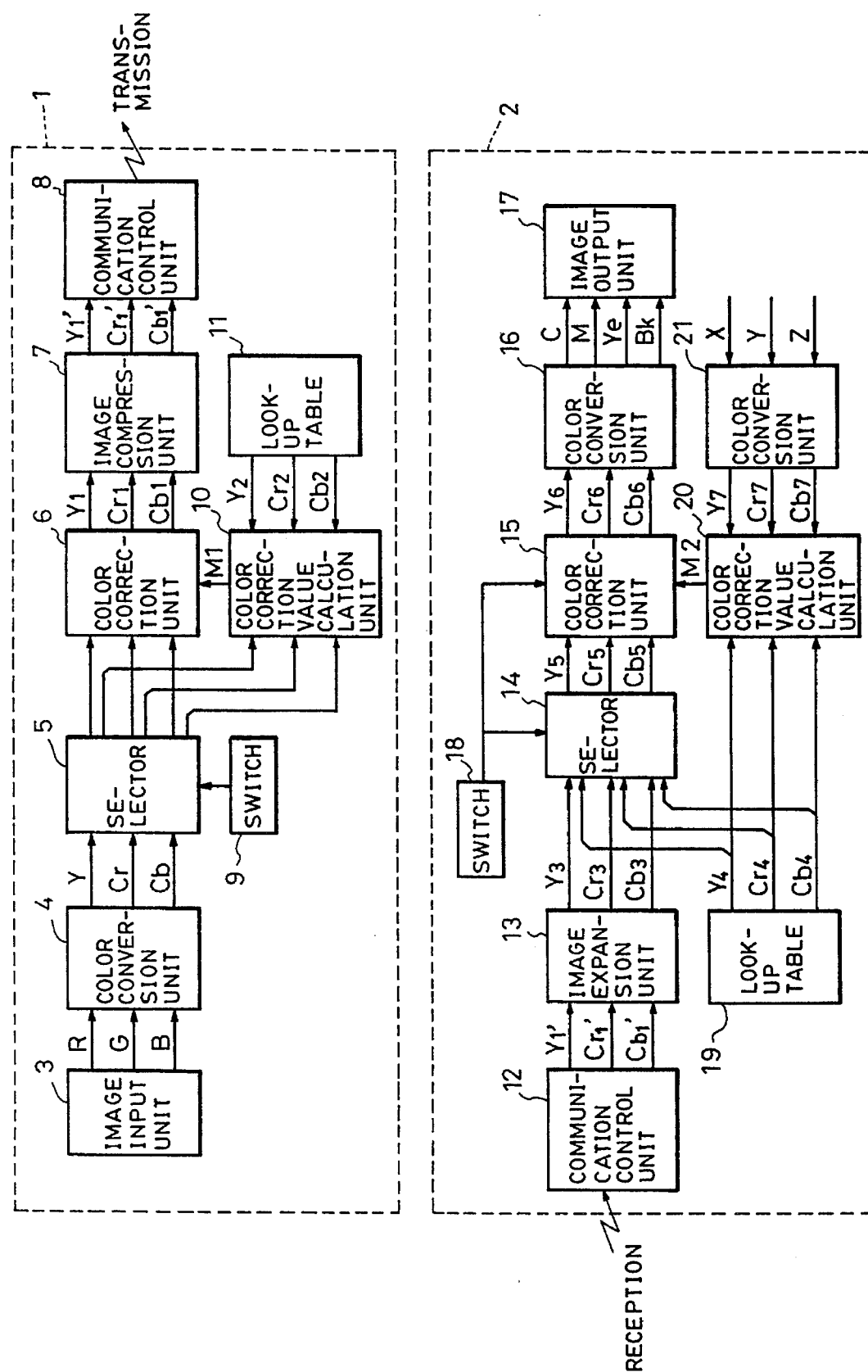
FIG. 1 is a block diagram showing the configuration of the hardware of a color image communication system according to a first embodiment of the present invention.

An explanation will now be provided of a color image communication system of the present invention with reference to FIG. 1. FIG. 1 shows an example of the configuration of hardware for realizing the present invention.

In normal color image communication, a color image is transmitted from a color scanner i at the transmitting side to a color printer 2 at the receiving side via a communication network or the like. At that time, the following processing is performed within the color scanner 1. That is, the image to be transmitted is read by an image input unit 3 comprising a CCD (charge-coupled device) line sensor or the like, and digital color signals R, G and B for each picture element are obtained, The signals R, G and B are primary-color component signals for red, green and blue, respectively. The color signals R, G and B are converted into color signals Y, Cr and Cb (Y is a luminance signal. Cr and Cb are color signals) suitable for color image compression by a color conversion unit 4. This conversion is a linear transformation expressed by the following expression (1):

$$\begin{pmatrix} Y \\ Cr \\ Cb \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix}. \quad (1)$$

A switch 9 is provided in an operation unit (not shown), and switches between a transmission mode (normal mode) for actually transmitting the image and a color correction value calculation mode (calibration mode) for calculating parameters of color correction performed in a color correction unit 6 (to be described later). A state set by the switch 9 is transmitted to a selector 5. In the above-described communication operation, the switch 9 is set to the transmission mode. The selector 5 detects the state of the switch 9, and the color signals Y, Cr and Cb are transmitted to the color correction unit 6. The color correction unit 6 corrects color characteristics peculiar to the color scanner 1, such as characteristics of the CCD sensor of the image input unit 3, conversion characteristics of the color conversion unit 4 and the like, and converts the color signals Y, Cr and Cb into standard color signals $Y_1$, $Cr_1$ and $Cb_1$. A color correction matrix M1 is preset by a color correction value calculation unit 10, and matrix calculation expressed by the following expression (2) is performed:

$$\begin{pmatrix} Y_1 \\ Cr_1 \\ Cb_1 \end{pmatrix} = \begin{pmatrix} b_{11} & b_{12} & b_{13} \\ b_{21} & b_{22} & b_{23} \\ b_{31} & b_{32} & b_{33} \end{pmatrix} \begin{pmatrix} Y \\ Cr \\ Cb \end{pmatrix}. \quad (2)$$

Figure 3:
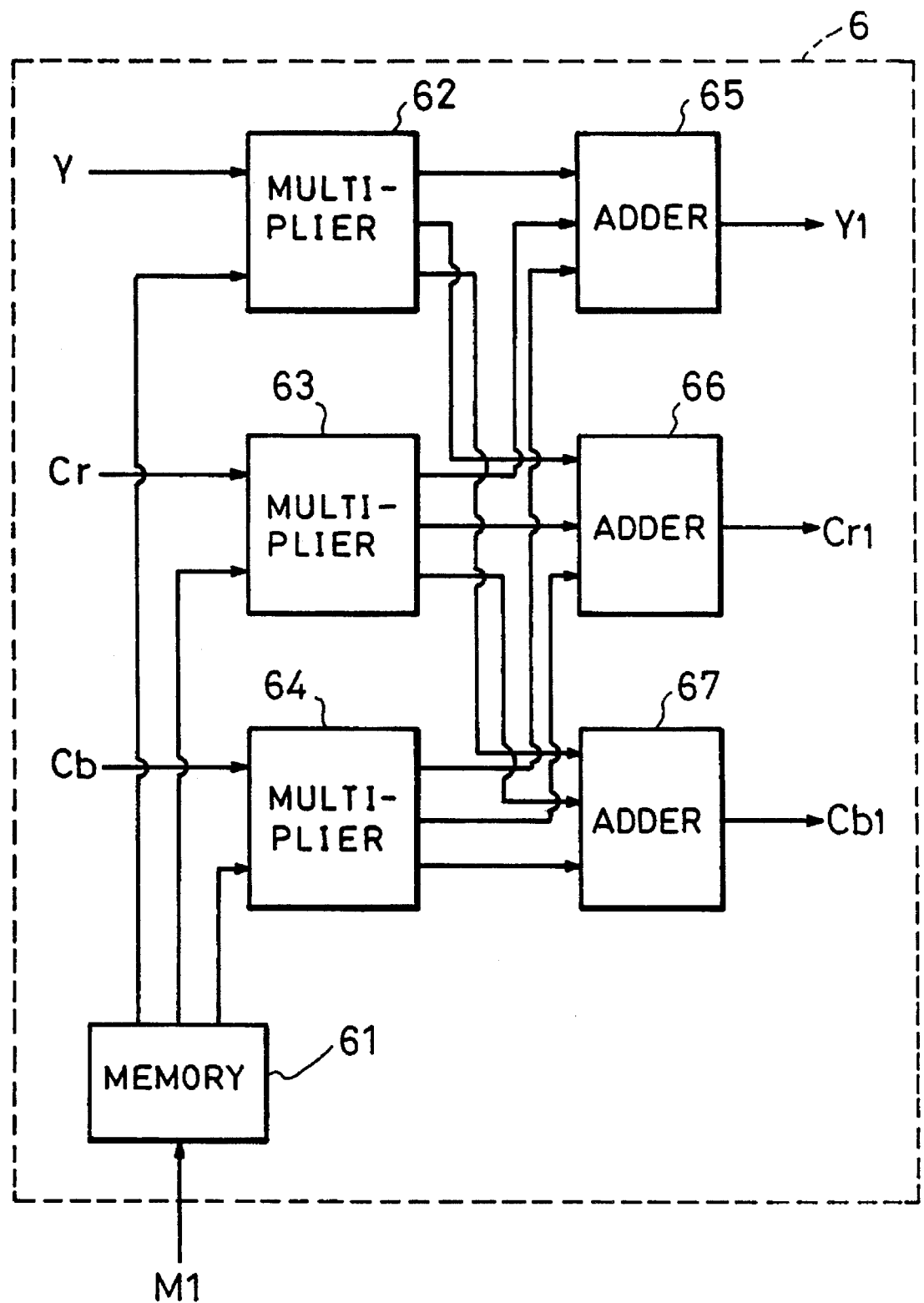
FIG. 3 is a diagram illustrating a color correction unit 6 shown in FIG. 1.

FIG. 3 shows an example of the configuration of hardware illustrating the detail of the color correction unit 6. The matrix M1 set by the color correction value calculation unit 10 is preserved in a rewritable memory 61 (for example, a RAM). The color signals Y, Cr and Cb for each picture element of the transmitted image are multiplied by the first, second and third columns of the color correction matrix M1 by multipliers 62, 63 and 64, respectively. The matrix calculation expressed by expression (2) is realized by adding respective multiplied items by adders 65, 66 and 67. Thus, the color signals Y, CF and Cb are converted into the standard color signals $Y_1$, $Cr_1$ and $Cb_1$, respectively.

The standard color signals $Y_1$, $Cr_1$ and $Cb_1$ are converted into compressed color signals $Y_1'Cr_1'$ and $Cb_1'$ by an image compression unit 7, respectively. The image compression unit 7 compresses the image using an ADCT (adaptive discrete cosine transform) method which is an encoding method for a color still-picture image. According to the ADCT method, the respective standard color signals $Y_1$, $Cr_1$ and $Cb_1$ are converted for every 8×8 picture-element block by a two-dimensional discrete cosine transform (DCT). The compressed color signals $Y_1'$, $Cr_1'$ and $Cb_1'$ are obtained by performing scalar quantization of conversion coefficients of the discrete cosine transform using a predetermined quantization table, and encoding coefficients quantized by variable-length codes (Huffman codes). The compressed color signals $Y_1'$, $Cr_1'$ and $Cb_1'$ are transmitted to a communication control unit 8, which transmits the signals via the communication network such as a digital communication network, integrated services digital network (ISDN) or the like in accordance with a communication protocol. An explanation has been provided of the flow of color signal processing within the color scanner 1 at the transmitting side in color image communication.

Next, an explanation will be provided of processing within the color printer 2 at the receiving side in color image communication The compressed color signals $Y_1'$, $Cr_1'$ and $Cb_1'$ received by a communication control unit 12 via the digital communication net, work are transmitted to an image expansion unit 13. The image expansion unit 13 expands the encoded compressed color signals $Y_1'$, $Cr_1'$ and $Cb_1'$ into standard color signals $Y_3$, $Cr_3$ and $Cb_3$ using the ADCT method.

The method of expansion comprises a procedure reverse to the above-described procedure of compression. That is, the received Huffman codes are decoded, decoded coefficients are subjected to inverse quantization using the same quantization table used in the quantization, and the obtained coefficients are subjected to inverse DCT transform. According to the above-described procedure, the standard color signals $Y_3$, $Cr_3$ and $Cb_3$ are obtained.

A switch 18 is provided in an operation unit (not shown) of the apparatus at the receiving side, and switches between a reception mode for receiving the image and a color correction value calculation mode for calculating parameters for color correction in a color correction unit 15 (to be described later). The state of the switch 18 is transmitted to a selector 14. In the case of the reception mode, the selector 14 transmits the standard color signals $Y_3$, $Cr_3$ and $Cb_3$ from the image expansion unit 13 to the color correction unit 15. The color correction unit 15 converts standard color signals $Y_5$, $Cr_5$ and $Cb_5$ into color signals $Y_6$, $Cr_6$ and $Cb_6$ containing characteristics of the color printer 2 in consideration of color characteristics peculiar to the color printer 2. Such characteristics include conversion characteristics of a color conversion unit 16, output characteristics of an image output unit 17, and the like. This conversion is performed by matrix calculation expressed by the following expression (3) using a matrix M2 preset by a color correction value calculation unit 20:

$$\begin{pmatrix} Y_6 \\ Cr_6 \\ Cb_6 \end{pmatrix} = \begin{pmatrix} c_{11} & c_{12} & c_{13} \\ c_{21} & c_{22} & c_{23} \\ c_{31} & c_{32} & c_{33} \end{pmatrix} \begin{pmatrix} Y_5 \\ Cr_5 \\ Cb_5 \end{pmatrix}. \quad (3)$$

Since this calculation is a 3×3 matrix calculation, the calculation can be realized by the same configuration of the hardware as that shown in FIG. 3. Subsequently, the color signals $Y_6$, $Cr_6$ and $Cb_6$ are converted into color signals C (cyan), M (magenta), Ye (yellow) and Bk (black) suitable for printing by the color conversion unit 16, and the received image is output from the image output unit 17.

The color conversion unit 16 comprises a table configured by a RAM (random access memory), a ROM (read-only memory), a gate array or the like for directly outputting C, M, Ye and Bk signals for the input $Y_6$, $Cr_6$ and $Cb_6$ signals. However, the C, M and Ye signals may be first generated, and subsequently the Bk signal may be extracted by performing UCR (undercolor removal).

The image output unit 17 comprises a printer for performing a hard copying operation, such as a laser-beam printer, a thermal transfer printer, an ink-jet printer or the like. The ink-jet printers include a so-called bubble-jet printer which uses a head for discharging liquid drops by utilizing film boiling by thermal energy.

The color conversion unit 16 may, for example, convert color signals into R, G and B signals of the NTSC system to perform display monitoring on a display unit.

Processing at the transmitting side and the receiving side and the flow of color signals in color image communication have been explained. Next, an explanation will be provided of a method of calculating color correction values which do not depend on the particular type of apparatus.

The method of calculating color correction values of the color scanner 1 at the transmitting side is as follows. That is, the color correction values correspond to the 3×3 matrix M1 shown in expression (2), and function so as to convert the color signals Y, Cr and Cb containing characteristics peculiar to the scanner into the standard color signals $Y_1$, $Cr_1$ and $Cb_1$ representing original colors of the image to be transmitted. In order to obtain the color correction values, a color patch having N colors shown in FIG. 2 is used.

Figure 2:
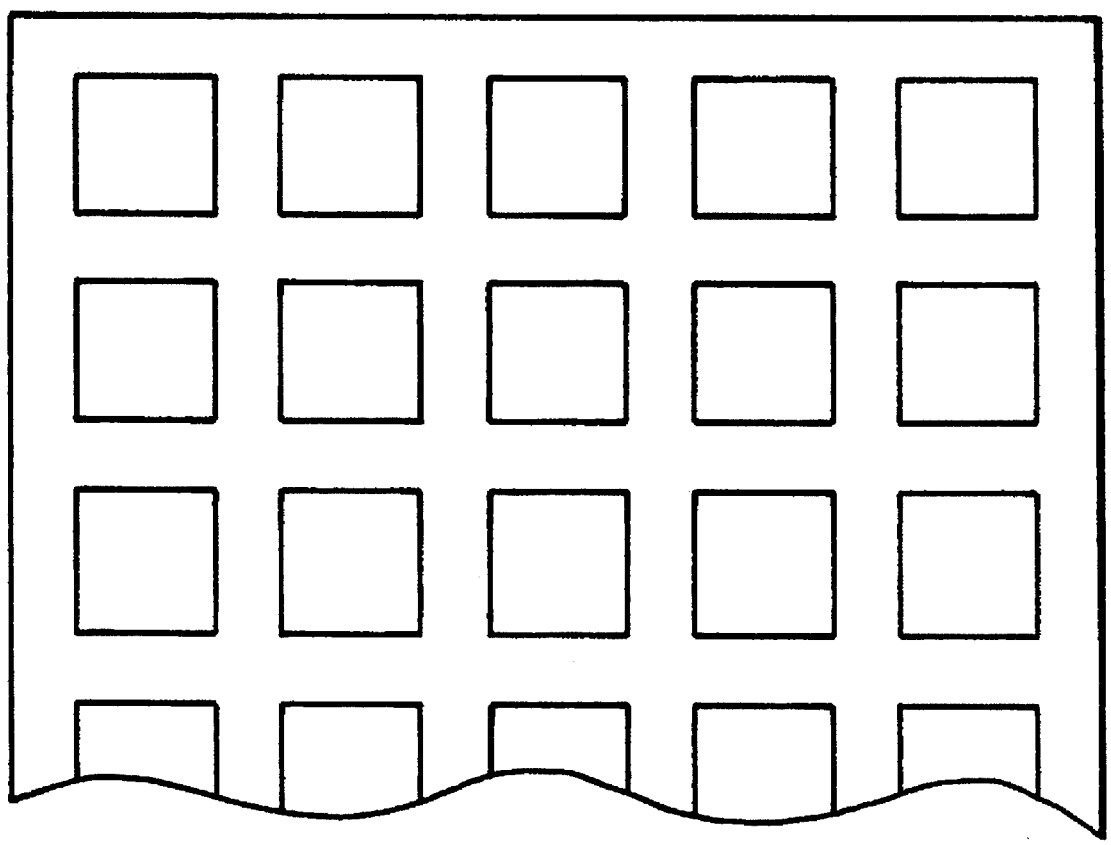
FIG. 2 is a diagram illustrating a color patch.

An explanation will now be provided of a standard color image, in this case a color patch, used in calculating color correction values of the present invention with reference to FIG. 2. FIG. 2 shows an example of the color patch. The color patch is a scale of colors, wherein a large number of representable colors are printed by combining four-color inks, i.e., cyan, magenta, yellow and black, with various ratios of the amounts of the inks. By measuring these colors in the color patch in advance by a colorimeter, color data $(Y_2, Cr_2, Cb_2)$ for each of N colors are obtained. The color data $(Y_2, Cr_2, Cb_2)$ for respective N colors are preserved in a look-up table 11 in order to use them in calculating color correction values. A color patch having known color data may be used in the present processing.

The color patch is read by the image input unit 3, and obtained color signals R, G and B are converted into color signals Y, Cr and Cb by the color conversion unit 4 using expression (1). In this case, the state of the switch 9 is set to the color correction value calculation mode. The selector 5 transmits the color signals Y, Cr and Cb to the color correction value calculation unit 10 in accordance with the state of the switch 9. The color correction value calculation unit 10 reads original color data $Y_2$, $Cr_2$ and $Cb_2$ of a color read by the image input unit 3 and converted into color signals Y, Cr and Cb from the look-up table 11, and performs calculation expressed by the following expression (4):

$$E1^2 = \sum_{k=1}^{N} \{(Y_2 - b_{11}Y - b_{12}Cr - b_{13}Cb)^2 + (Cr - b_{21}Y - b_{22}Cr - b_{23}Cb)^2 + (Cb - b_{31}Y - b_{32}Cr - b_{33}Cb)^2\} \quad (4)$$

Values $b_{11}$–$b_{33}$ used to minimize the E1 are calculated for N colors.

That is, the calculation is performed according to the so-called method of least squares so as to minimize errors from the squares of the color signals Y, Cr and Cb input from the image input unit 3 and the standard color data $Y_2$, $Cr_2$ and $Cb_2$.

Figure 4A:
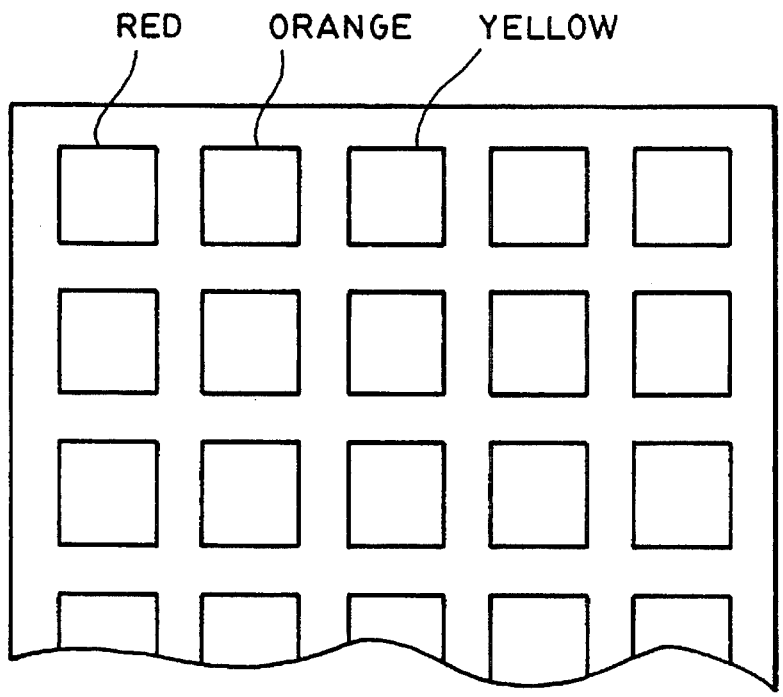
FIGS. 4(a) and 4(b) are diagrams illustrating color patches.
Figure 4B:
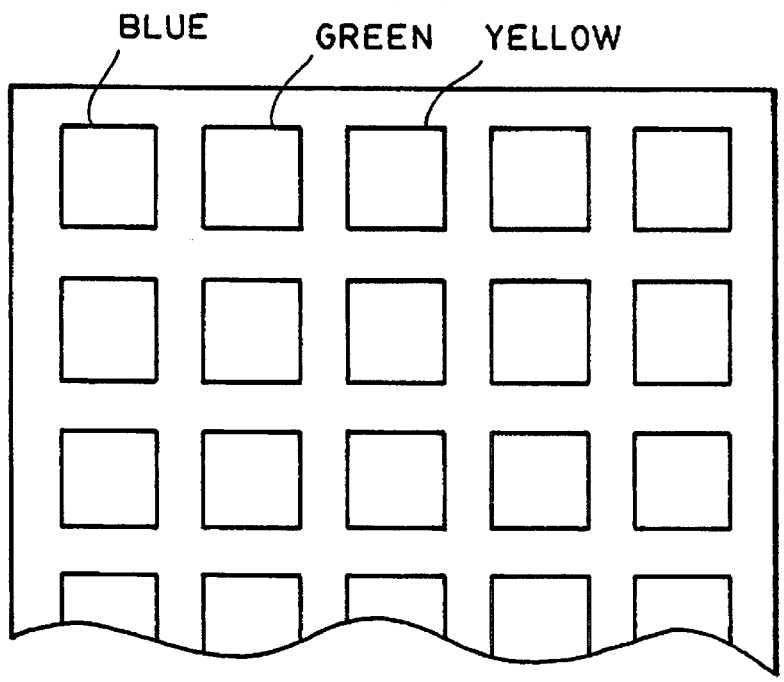

The obtained matrix M1 is set in the memory 61 of the color correction unit 6. The color correction values differ in accordance with how colors in the color patch are selected. For general use, a color patch wherein colors are uniformly distributed over the entire color space may be selected. If it is desired to perform color reproduction particularly for a specific color with high accuracy, a patch of colors close to the specific color may be principally read. For example, if accuracy is needed for reddish colors, a warm-color-type color patch may be used, as shown in FIG. 4(a). If accuracy is needed for bluish colors, cold-color-type color patch may be used, as shown in FIG. 4(b).

The method of calculating color correction values of the color printer 2 at the receiving side is as follows. The color correction values correspond to the 3×3 matrix M2 shown in expression (3, and functions so as to convert the standard color signals $Y_5$, $Cr_5$ and $Cb_5$ representing original colors of the image into the color signals $Y_6$, $Cr_6$ and $Cb_6$ matched to characteristics of the printer. First, the switch 18 is set to the color correction value calculation mode by an operation unit (not shown). The selector 14 reads standard color signals $Y_4$, $Cr_4$ and $Cb_4$ from a look-up table 19. Values $Y_4$, $Cr_4$ and $Cb_4$ for N colors corresponding to a color patch wherein colors are uniformly distributed in the color space comprising Y, Cr and Cb signals are preset in the look-up table 19. The read standard color signals $Y_4$, $Cr_4$ and $Cb_4$ are subjected to no processing by the color correction unit 15 due to the state (the color correction value calculation model of the switch 18, are converted into color signals C, M and Ye by the color conversion unit 16, and are output as a color patch from the image output unit 17. The color patch output from the color printer 2 is subjected to a colorimetry process by a colorimeter, whereby color data X, Y and Z for N colors recommended by the CIE (Commission Internationale de l'Eclairage) are obtained. The X, Y and Z values are input to a color conversion unit 21, and color signals $Y_7$, $Cr_7$ and $Cb_7$ are obtained. This conversion is obtained by a linear transformation expressed by the following expression (5):

$$\begin{pmatrix} Y_7 \\ Cr_7 \\ Cb_7 \end{pmatrix} = \begin{pmatrix} d_{11} & d_{12} & d_{13} \\ d_{21} & d_{22} & d_{23} \\ d_{31} & d_{32} & d_{33} \end{pmatrix} \begin{pmatrix} X \\ Y \\ Z \end{pmatrix}. \quad (5)$$

The color signals $Y_7$, $Cr_7$ and $Cb_7$ are the results of outputs which can be obtained by color reproducing characteristics of the color printer 2. That is, when the standard color signals $Y_4$, $Cr_4$ and $Cb_4$ are provided, a color patch having the values of the color signals $Y_7$, $Cr_7$ and $Cb_7$ is output. Hence, if it is desired to output a color patch corresponding to the values of the color signals $Y_7$, $Cr_7$ and $Cb_7$, the values of the color signals $Y_4$, $Cr_4$ and $Cb_4$ may be input to the printer 2. That is, the color correction value calculation unit 20 is a unit for calculating the matrix M2 for converting standard color signals so as to represent the desired color. More specifically, values $c_{11}$–$c_{33}$ are calculated for N colors so as to minimize the value E2 expressed by the following expression (6):

$$E2^2 = \sum_{k=1}^{N} \{(Y_7 - c_{11}Y_4 - c_{12}Cr_4 - c_{13}Cb_4)^2 + (Cr_7 - c_{21}Y_4 - c_{22}Cr_4 - c_{23}Cb_4)^2 + (Cb_7 - c_{31}Y_4 - c_{32}Cr_4 - c_{33}Cb_4)^2\} \quad (6)$$

The obtained matrix M2 is set in the color correction unit 15. Color correction values differ in accordance with how colors are set in the look-up table 19, as in the case of the color scanner 1.

As explained above, according to the present embodiment, by providing a color correction value calculation unit, and a memory for storing color data of a color patch to be used in calculating color correction values both in a color scanner and a color printer or both in a scanner unit and a printer unit of an apparatus incorporating these units, each of the color scanner and the color printer can independently perform color correction without depending on the kind of the apparatus at the communication partner. Hence, the present embodiment has the effects that it is possible to obtain a received output image accurately reproducing a transmitted original image, and that color reproducibility is guaranteed even if the kind of communication apparatus changes.

Particularly in the present embodiment, since image communication is performed using a digital network, such as the ISDN or the like, error correction is performed in the network, whereby reliability of digital data is secured. Hence, it is effective to standardize image signals by determining color correction parameters by a feedback system at the transmitting side, as in the present embodiment.

Second Embodiment

An explanation will now be provided of a second embodiment of the present invention with reference to FIG. 5.

In the above-described embodiment, an explanation has been provided about a case wherein characteristics of an image data processing unit before an image is compressed are corrected, and about a case wherein characteristics of the image data processing unit after the image has been expanded are corrected. In the present embodiment, however, it is also possible to perform color correction in consideration of a change in color characteristics in image compression/expansion.

An explanation will now be specifically provided. In FIG. 5, like components having the same functions as those shown in FIG. 1 are indicated by like numerals, and an explanation thereof will be omitted.

When the transmission mode is set by the switch 9, R, G and B signals input from the image input unit 3 are converted into Y, Cr and Cb signals by the color conversion unit 4, are then corrected into $Y_1$, $Cr_1$ and $Cb_1$ signals in accordance with predetermined color correction parameters by the color correction unit 6, and are subjected to compression encoding into $Y_1'$, $Cr_1'$ and $Cb_1'$ signals by the image compression unit 7. In this mode, the communication control unit 8 is selected by a selector 201 and the $Y_1'$, $Cr_17$ and $Cb_17$ signals are transmitted.

When the color correction value calculation mode is set by the switch 9, a color patch is input from the image input unit 3, and the same processing as described above is performed for obtained signals until the selector 201. Subsequently, the selector 201 selects an image expansion unit 202, which expands the signals into $Y_1''$, $Cr_1''$ and $Cb_1''$ signals, which are input to the color correction value calculation unit 10. In this mode, input signals are not subjected to processing by the color correction unit 6, and are therefore output without modification. The color correction value calculation unit 10 performs the same calculation as in the first embodiment so as to minimize errors from the squares of $Y_2$, $Cr_2$ and $Cb_2$ signals stored in the look-up table and the $Y_1''$, $Cr_1''$ and $Cb_1''$ signals, and outputs the correction matrix M1 to the color correction unit 6. Subsequently, color correction is performed according to the correction matrix M1.

Also at the receiving side, color correction in consideration of deterioration due to image expansion is performed as described below.

In the case of reception, the same processing as in the first embodiment is performed.

When the color correction value calculation mode is set by the switch 18, signals $Y_4$, $Cr_4$ and $Cb_4$ of a color patch, serving as a standard image, output from the look-up table 19 are compressed by an image compression unit 203, are selected by a selector 204, are expanded by the image expansion unit 13, and are transmitted to a selector 205 as $Y_3$, $Cr_3$ and $Cb_3$ signals. In this mode, both the color correction unit 15 and the color correction value calculation unit 20 are selected by the selector 205. The signals are not subjected to processing by the color correction unit 15, are then converted into C, M, Ye and Bk signals by the color conversion unit 16. A color patch is then output from the image output unit 17. The output color patch is subjected to colorimetry by a colorimeter, and the color correction matrix M2 is calculated according to the same procedure as in the first embodiment.

As described above, according to the present embodiment, color correction can be performed in consideration of deterioration in an image due to compression/expansion.

Already-compressed data may be stored in the look-up table 19 as the standard signals at the receiving side. In such a case, the image compression unit 203 becomes unnecessary. Hence, the configuration of circuitry is simplified.

Third Embodiment

An explanation will now be provided of a third embodiment of the present invention with reference to FIG. 6.

In the present embodiment, the portion for performing color correction calculation in the first embodiment has a detachable configuration so as to be separated from the transmitter and the receiver.

That is, at the transmitting side, the look-up table 11 for outputting standard color signals $Y_2$, $Cr_2$ and $Cb_2$ and the color correction value calculation unit 10 are independently provided as a color correction value calculation device 301, which communicates data via an I/O port 302 of the main body of the transmitter. When a standard patch is input are input, Y, Cr and Cb signals are provided to the calculation device 301. The correction matrix M1 is obtained by performing a calculation in the same manner as described above is output to the side of the main body.

A microcomputer may, for example, be used for such a color correction value calculation device, and may be operated in accordance with a program for realizing the above-described method of calculation.

At the receiving side, the look-up table 19, the color correction value calculation unit 20 and the color conversion unit 21 are independently provided as a color correction value calculation device 303, which communicates data via an I/O port 304.

The calculation devices 301 and 303 may be realized by a common computer by switching software.

According to the present embodiment, it becomes unnecessary to provide dedicated circuitry for calculating color correction values in the transmitting side and the receiving side, and therefore the configuration of circuitry is simplified.

Particularly when the above-described color correction value calculation may be performed when an apparatus is shipped from a factory, it is possible to omit components for the above-described calculation device, and therefore to reduce the production cost.

When an apparatus is adjusted by a serviceman, the calculation devices 301 and 302 may be realized by a portable microcomputer.

Alternatively, as shown in FIG. 7, read values of Y, Cr and Cb signals may be displayed on a display unit 305 provided in an operation unit (not shown), and the values may be input using a key input unit 307 of the calculation device 301. In such a case, numerical values as the result of calculation are displayed on a display unit 308, and the values are input using a ten-key input unit 306 provided in the operation unit.

Also at the receiving side, a ten-key input unit 309 may be provided, and a numerical-value display unit 310 may be provided in the calculation device 303.

As described above, by displaying and inputting numerical values manually by the operator, it becomes unnecessary to provide dedicated I/O ports, and therefore the configuration of circuitry is simplified.

Fourth Embodiment

In the above-described embodiments, when color correction values of the color printer 2 are calculated, a color patch is first output and is subjected to colorimetry by a colorimeter. X, Y and Z values are then input to the color conversion unit 21. However, when color image communication is performed by a color scanner and a color printer, or an apparatus incorporating a color scanner and a color printer, if the matrix M1 of the color scanner unit is already obtained, colorimetry by a colorimeter becomes unnecessary if an output color patch is read by the color scanner unit and output signals $Y_1$, $Cr_1$ and $Cb_1$ of the color correction unit 6 are used as input signals to the color correction value calculation unit 20.

Figure 8:
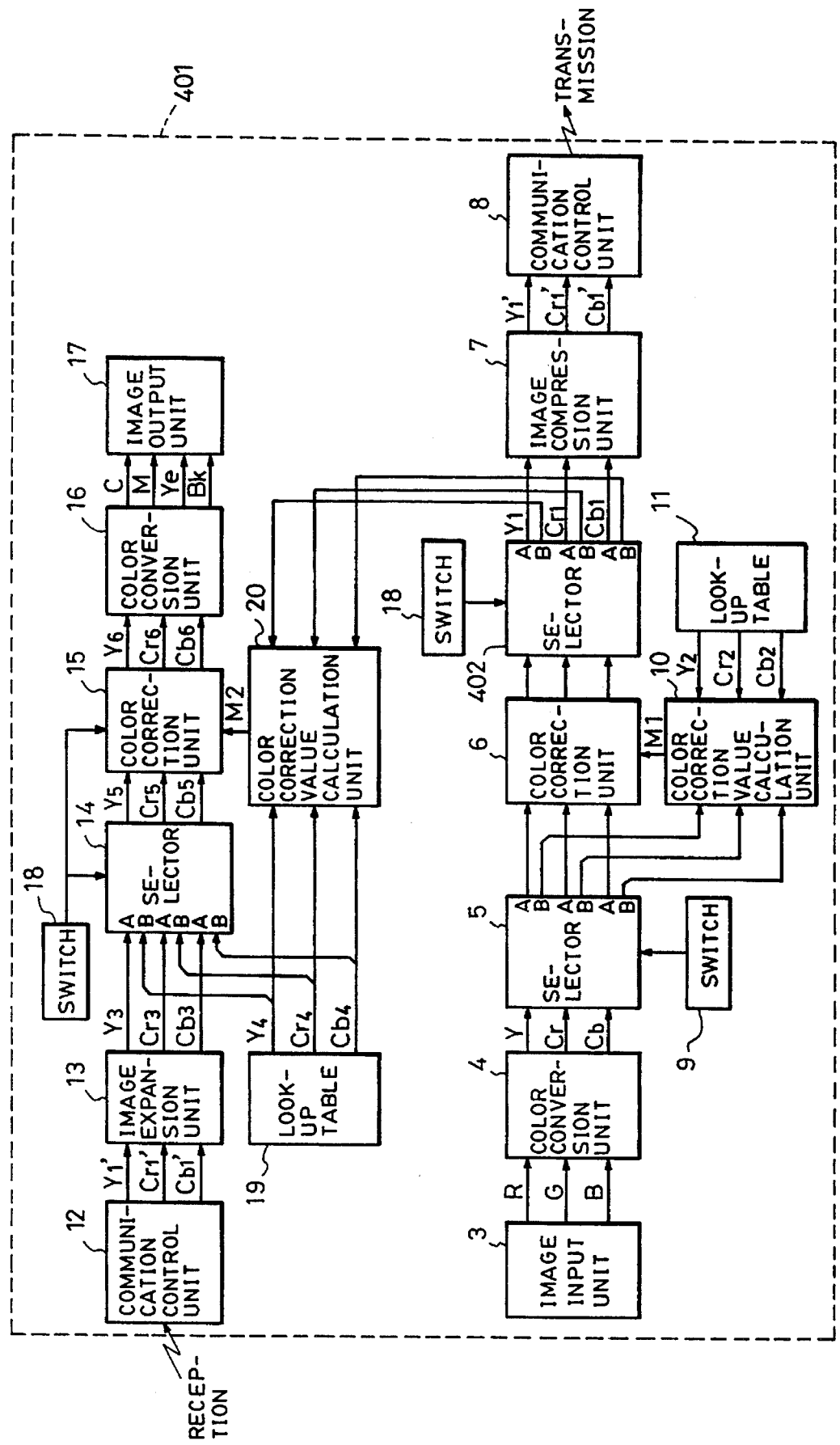
FIG. 8 is a block diagram illustrating a fourth embodiment of the present invention.

FIG. 8 illustrates the above-described fourth embodiment of the present invention.

In FIG. 8, an image communication apparatus 401 incorporates a reader and a printer. In the present embodiment, the color correction matrix M1 of the transmitting unit (input side) is first determined by the above-described method. At that time, the switch 18 selects terminals A of a selector 402. After an image standardized by the color correction unit 6 can be output, the color correction matrix M2 of the receiving side (output side) is determined. At that time, the switch 18 selects terminals B of the selector 402. The switch 18 is linked with the selector 14, and the apparatus assumes the color correction value calculation mode. The present embodiment differs from the above-described embodiments in that the color patch image output from the image output unit 17 is read by the image input unit 3, but the method of calculation is the same as in the above-described embodiments.

According to the present embodiment, the color conversion unit 21 shown in FIG. 1 and a colorimeter becomes unnecessary, and it becomes possible to perform calculation of color correction values only by the system of the apparatus.

Fifth Embodiment

Figure 9:
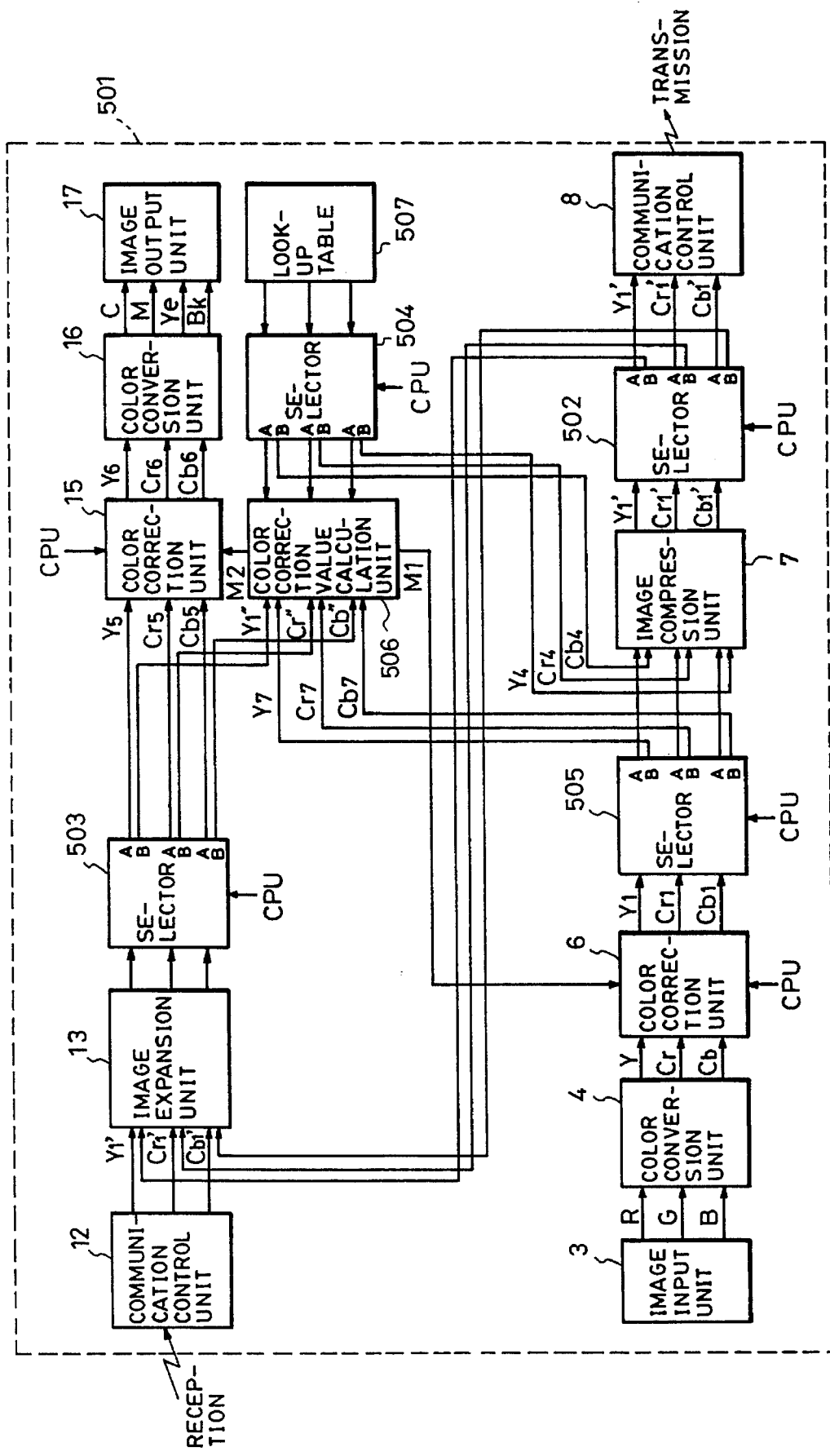
FIG. 9 is a block diagram illustrating a fifth embodiment of the prensent invention.

FIG. 9 is a diagram illustrating a fifth embodiment of the present invention.

In FIG. 9, an image communication apparatus 501 incorporates a reader and a printer as the apparatus shown in FIG. 8. In the present embodiment, errors due to compression/expansion of an image are also considered in determining parameters for color correction.

An explanation will now be provided of the method of calculating color correction values in the present embodiment.

Determination of color correction values of the color correction unit 6

First, a standard color image is input from the image input unit 3, and is subjected to color conversion by the color conversion unit 4. The color correction unit 6 passes image data without modification according to an instruction from a CPU (central processing unit, not shown). Terminals A of a selector 505 are selected according to an instruction from the CPU, and the image data are transmitted to the image compression unit 7. Terminals B of a selector 502 are selected, and the data compressed by the image compression unit 7 are transmitted to the image expansion unit 13. Sides B of a selector 503 are selected, and the image data expanded by the image expansion unit 13 are input to color correction value calculation unit 506. Standard image data $Y_2$, $Cr_2$ and $Cb_2$ are input from a look-up table 507 to a color correction value calculation unit 506 via terminals A of a selector 504. The color correction value calculation unit 506 performs the same calculation of correction values as in the fourth embodiment, and the correction matrix M1 is set in the color correction unit 6.

Determination of color correction values of the color correction unit 15

Subsequently, standard image data $Y_4$, $Cr_4$ and $Cb_4$ are output from the look-up table 507, and are compressed by the image compression unit 7 via terminals B of the selector 504. The compressed data are transmitted to the image expansion unit 13 via terminals B of the selector 502, and expanded data are input to the color correction unit 15 via terminals A of the selector 503. The data passes through the color correction unit 15 without modification in accordance with an instruction from the CPU, are subjected to color conversion by the color conversion unit 16, and are output as a visual image on a recording medium by the image output unit 17. The formed image is read by the image input unit 3, is subjected to color conversion by the color conversion unit 4, and is subjected to color correction in accordance with the color correction matrix M1 by the color correction unit 6. Terminals B of the selector 505 are selected, and color-corrected data $Y_7$, $Cr_7$ and $Cb_7$ are input to the color correction value calculation unit 506. The standard image data $Y_4$, $Cr_4$ and $Cb_4$ are input to the color correction value calculation unit 506 via terminals A of the selector 504. The color correction matrix M2 is calculated in the same manner as in the fourth embodiment, and is set in the color correction unit 15.

In the case of normal transmission/reception

Terminals A are selected for all the selectors 502, 503 and 505.

As described above, according to the present embodiment, since the compression unit and the expansion unit can be shared in calibration, the configuration of circuitry is simplified. The look-up table and the color correction value calculation unit can also be shared. Furthermore, a colorimeter may not be used.

Although, in the foregoing embodiments, obtained color signals are converted into color signals Y, Cr and Cb suitable for color image compression by the color conversion unit 4, the color signals are not limited to Y, Cr and Cb signals. For example, Y, U and V signals (more suitable for linear transformation than R, G and B signals) may be used, or other color values, such as Y, I and Q signals, L*, A* and b* signals, or the like, may also be used.

While 3×3 primary matrix calculation as shown in expressions (2) and (3) is performed in the color correction unit 6 and 15, respectively, the method of calculation is not limited thereto, but matrix calculation including secondary terms (nonlinear color correction calculation) may be performed in accordance with the capacity of the memory, calculation speed, conversion accuracy or the like.

While the ADCT method is used for performing compression encoding and expansion decoding of an image in the image compression unit 7 and the image expansion unit 13, the method to be used is not limited thereto, but any other method, such as DPCM (differential pulse code modulation), vector quantization or the like, may also be used.

Furthermore, the image input unit is not limited to a scanner which uses a CCD sensor, but a host computer, a VCR (video cassette recorder), a still-picture video camera or the like may also be used.

As described above, according to the present invention, color reproducibility in color image communication can be improved.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A color image processing apparatus for transmitting image data to a receiving apparatus having a function of performing color correction for received image data in accordance with a receiver color correction parameter determined in accordance with a standard color image comprised of plural color patches of respectively different colors, said apparatus comprising:

an image input unit for reading an image and for obtaining color image data therefrom, said image input unit being used in common to read a standard color image by which the receiving apparatus performs color correction and an input image so as to obtain standard color image data and input image data, respectively;

color correcting means for performing color correction on said input image data in accordance with a transmitter color correction parameter, which corrects for inaccuracy in said image input unit;

memory means for storing comparison values for each color in the plural color patches of respectively different colors comprising the standard color image;

calculating means for determining the transmitter color correction parameter for said color correcting means in accordance with the standard color image and the stored comparison values data; and transmitting means for transmitting the input image data corrected by said correcting means to the receiving apparatus.

2. The apparatus of claim 1, wherein said calculating means calculates the transmitter color correction parameter by using a look-up table stored in the memory means which stores the comparison values.

3. A color image processing apparatus according to claim 1, wherein said transmitting means transmits the input image data corrected by said correcting means to the receiving apparatus via a communication line.

4. A color image processing apparatus according to claim 3, wherein the communication line comprises a digital communication line.

5. A color image processing apparatus according to claim 4, wherein the digital communication line comprises a public communication line.

6. A color image processing method for transmitting image data to a receiving apparatus for performing color correction for received image data in accordance with a receiver color correction parameter determined in accordance with a standard color image comprised of plural color patches of respectively different colors, said method comprising the steps of:

reading an input image and a standard color image using a common image input unit to obtain input image data and standard color image data by which the receiving apparatus performs color correction, respectively;

performing color correction for said input image data in accordance with a transmitter color correction parameter, which corrects for inaccuracy in said image input unit;

storing comparison values for each color in the plural color patches of respectively different colors comprising the standard color image data;

determining the transmitter color correction parameter in said step of performing color correction in accordance with the standard color image data and the stored comparison values; and transmitting the input image data corrected in said step of performing color correction to the receiving apparatus.

7. The method of claim 6, wherein said step of determining comprises calculating the transmitter color correction parameter by using a look-up table stored in the memory means which stores the comparison values.

8. A color image processing method according to claim 6, wherein the input image data corrected by said correcting means is transmitted to the receiving apparatus via a communication line.

9. A color image processing apparatus for receiving image data from a transmitting apparatus for performing color correction for input image data in accordance with a transmitter color correction parameter determined on the basis of a standard color image, said apparatus comprising:

switching means for switching between a reception mode for receiving image data and a color correction calculation mode for performing color correction on the received image data;

receiving means for receiving the image data corrected by the transmitting apparatus;

color correcting means for performing color correction on the received image data in accordance with a receiver color correction parameter, said color correcting means performing color correction in the reception mode and not performing color correction in the color correction calculation mode;

outputting means for outputting color-corrected image data to an image forming means; and calculating means for determining, in the color correction calculation mode, the receiver color correction parameter of said color correcting means in accordance with a color image;

wherein the color image is formed by the image forming means in accordance with predetermined color image data which comprises the standard color image by which the transmitter color correction parameter is determined, and the image processing apparatus calibrates the receiver color correction parameter in accordance with the color image.

10. The apparatus of claim 9, wherein said calculating means includes a look-up table stored in a memory which stores standard color values which, in the color correction mode are formed by the image forming means, and which stores predetermined color image data with which color image data from the color image is compared so as to obtain the receiver color correction parameter.

11. A color image processing apparatus according to claim 9, wherein said receiving means receives the image data corrected by the transmitting apparatus via a communication line.

12. A color image processing apparatus according to claim 11, wherein the communication line comprises a digital communication line.

13. A color image processing apparatus according to claim 12, wherein the digital communication line comprises a public line.

14. A color image processing method for receiving image data from a transmitting apparatus for performing color correction of input image data in accordance with a transmitter color correction parameter determined in accordance with a standard color image, said method comprising the steps of:

switching to a reception mode for receiving the image data corrected by the transmitting apparatus;

receiving the image data corrected by the transmitting apparatus;

performing color correction for the received image data in accordance with a receiver color correction parameter, said step of performing color correction being performed in the reception mode;

switching to a color correction calculation mode for performing color correction calculation of the received image data;

outputting color-corrected image data to an image forming means; and determining, in the color correction calculation mode, the receiver color correction parameter in said step of performing color correction in accordance with a color image;

wherein said step of performing color correction is performed in the reception mode and not in the color correction calculation mode, wherein the color image is formed by the image forming means in accordance with predetermined color image data which comprises the standard color image by which the transmitter color correction parameter is determined, and wherein the transmitter color correction parameter is calibrated in accordance with the color image.

15. The method of claim 14, further comprising the step of forming, using an image forming means, standard color values stored in a look-up table in the memory, and wherein said step of determining includes the step of comparing color data from the standard color values with comparison values stored in a look-up table in the memory so as to obtain the receiver color correction parameter.

16. A color image processing method according to claim 14, wherein the image data corrected by the transmitting apparatus is received via a communication line.

* * * * *

UNITED STATES PATENT AND TRADEMARK OFFICE
CERTIFICATE OF CORRECTION

PATENT NO. : 5,489,998

DATED : February 6, 1996

INVENTOR(S) : Osamu Yamada, et al.

It is certified that error appears in the above-identified patent and that said Letters Patent is hereby corrected as shown below:

COLUMN 3:

Line 57, "scanner i" should read --scanner 1--.

COLUMN 5:

Line 3, "net, work" should read --network--.

COLUMN 6:

Line 62, "expression (3," should read --expression (3),-.

COLUMN 7:

Line 6, "model" should read --mode)--.

COLUMN 9:

Line 42, "302" should read --303--.

UNITED STATES PATENT AND TRADEMARK OFFICE
CERTIFICATE OF CORRECTION

PATENT NO. : 5,489,998

DATED : February 6, 1996

INVENTOR(S) : Osamu Yamada, et al.

It is certified that error appears in the above-identified patent and that said Letters Patent is hereby corrected as shown below:

COLUMN 11:

Line 33, "A*" should read --a*--.

COLUMN 13:

Line 37, "mode" should read --mode,--.

Signed and Sealed this

Fifth Day of November, 1996

Attest:

BRUCE LEHMAN

Attesting Officer     Commissioner of Patents and Trademarks